(12) United States Patent
Cheng et al.

(10) Patent No.: US 8,831,530 B2
(45) Date of Patent: Sep. 9, 2014

(54) COMMUNICATION SYSTEM WITH TRANSMISSION POWER ESTIMATION MECHANISM AND METHOD OF OPERATION THEREOF

(75) Inventors: Hongbing Cheng, San Diego, CA (US);
Soobok Yeo, San Diego, CA (US);
Kwangman Ok, San Diego, CA (US);
Inyup Kang, San Diego, CA (US)

(73) Assignee: Samsung Electronics Co., Ltd.,
Gyeonggi-Do (KR)

( * ) Notice: Subject to any disclaimer, the term of this patent is extended or adjusted under 35 U.S.C. 154(b) by 306 days.

(21) Appl. No.: 13/460,498

(22) Filed: Apr. 30, 2012

(65) Prior Publication Data

US 2013/0287135 A1      Oct. 31, 2013

(51) Int. Cl.
*H04B 17/00*      (2006.01)

(52) U.S. Cl.
USPC ............... 455/67.13; 455/501; 455/550.1; 375/148; 375/285

(58) Field of Classification Search
USPC ............ 455/63.1, 67.11, 67.13, 114.2, 115.1, 455/115.3, 501, 550.1; 375/148, 285, 346
See application file for complete search history.

(56) References Cited

U.S. PATENT DOCUMENTS

| | | | |
|---|---|---|---|
| 5,297,161 A | 3/1994 | Ling | |
| 5,412,686 A | 5/1995 | Ling | |
| 6,952,591 B2 * | 10/2005 | Budka et al. | 455/517 |
| 7,421,009 B2 | 9/2008 | Kawamoto et al. | |
| 7,532,864 B2 | 5/2009 | Fukuoka et al. | |
| 7,733,942 B2 * | 6/2010 | Hasegawa | 375/148 |
| 7,830,952 B2 * | 11/2010 | Eriksson et al. | 375/148 |
| 7,995,973 B2 * | 8/2011 | Dent et al. | 455/87 |
| 8,019,021 B2 * | 9/2011 | Lee et al. | 375/324 |
| 2007/0054692 A1 | 3/2007 | Nie et al. | |
| 2011/0026574 A1 | 2/2011 | Zhou et al. | |

* cited by examiner

*Primary Examiner* — Nhan Le
(74) *Attorney, Agent, or Firm* — IP Investment Law Group

(57) ABSTRACT

A method of operation of a communication system includes: calculating a total received power estimation based on a designated received signal having a designated pilot symbol; calculating an instantaneous channel estimation based on the designated pilot symbol calculating a channel gain power estimation based on the instantaneous channel estimation; calculating a total interference power estimation based on a difference between the instantaneous channel estimation and a delayed channel estimation; calculating a designated received power based on a difference between the total received power estimation and the total interference power estimation; and determining a relative transmission power estimation based on the designated received power and the channel gain power estimation for communicating with a device.

20 Claims, 6 Drawing Sheets

COMMUNICATION SYSTEM WITH TRANSMISSION POWER ESTIMATION MECHANISM AND METHOD OF OPERATION THEREOF

TECHNICAL FIELD

The present invention relates generally to a communication system and more particularly to a system with signal processing mechanism.

BACKGROUND ART

A cellular network is a radio network distributed over land areas called cells, each served by at least one fixed-location transceiver known as a cell site or base station. When joined together, these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission. The ever increasing need for information in modern life requires reliable transfer of data between transceivers. However, the transfer of data between transceivers can be obscured by noise and interference from other transceivers and reduce reliability of communication.

Thus, a need still remains for reliable and fast cellular networks. In view of the shrinking amount of available frequencies, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a communication system, including: calculating a total received power estimation based on a designated received signal having a designated pilot symbol; calculating an instantaneous channel estimation based on the designated pilot symbol; calculating a channel gain power estimation based on the instantaneous channel estimation; calculating a total interference power estimation based on a difference between the instantaneous channel estimation and a delayed channel estimation; calculating a designated received power based on a difference between the total received power estimation and the total interference power estimation; and determining a relative transmission power estimation based on the designated received power and the channel gain power estimation for communicating with a device.

The present invention provides a communication system, including: a total received power module for calculating a total received power estimation based on a designated received signal having a designated pilot symbol; a despreader module, coupled to the total received power module, for calculating an instantaneous channel estimation based on the designated pilot symbol; a channel power module, coupled to the despreader module, for calculating a channel gain power estimation based on the instantaneous channel estimation; an interference power module, coupled to the despreader module, for calculating a total interference power estimation based on a difference between the instantaneous channel estimation and a delayed channel estimation; a designated received power module, coupled to the interference power module, for calculating a designated received power based on a difference between the total received power estimation and the total interference power estimation; and a designated transmission power module, coupled to the designated received power module, for determining a relative transmission power estimation based on the designated received power and the channel gain power estimation for communicating with a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
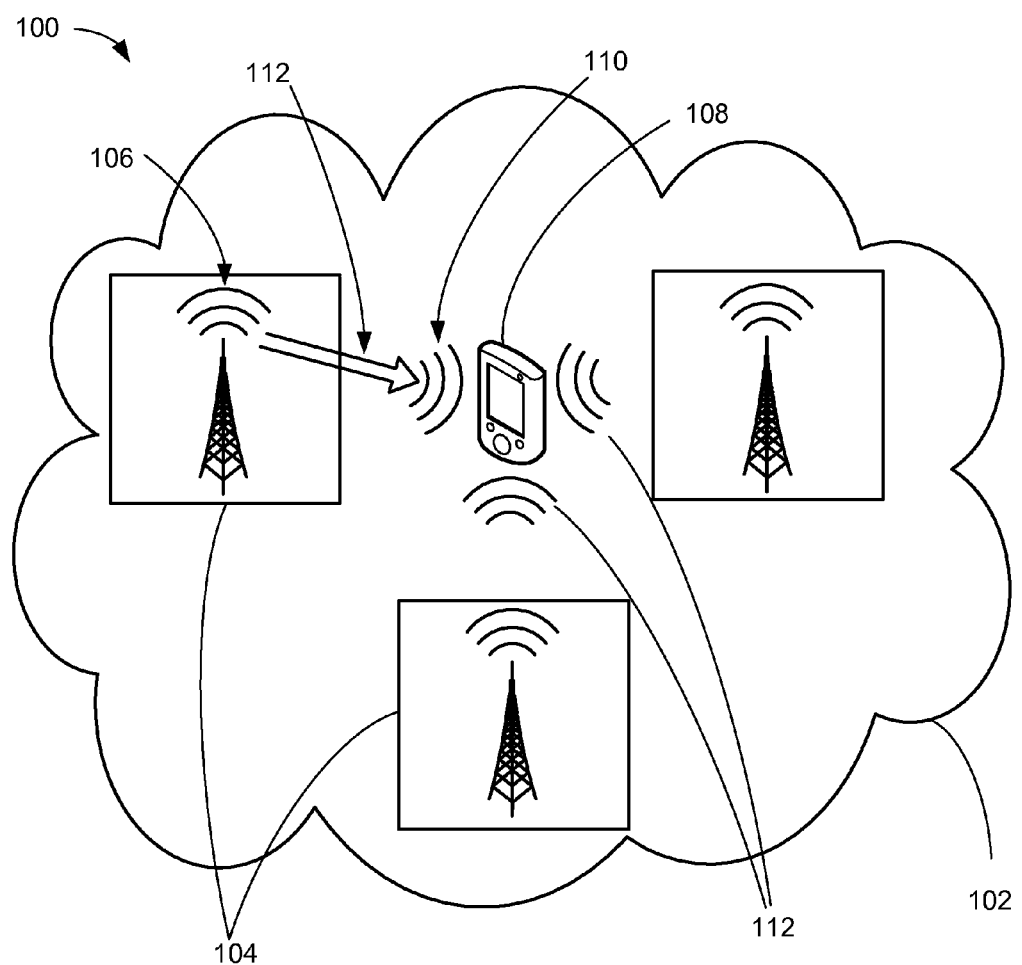
FIG. 1 is a communication system with transmission power estimation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures to peripheral storage devices, manipulating data structures, and reading data structures from external sources. Data structures are defined to be files, input data, system generated data, such as calculated data, and program data.

The transmission power estimation in wireless communications can be used for interference cancellation or suppression, signal to noise ratio (SINR) measurement, and power control. Due to the broadcast nature of wireless communications, the receivers in wireless systems usually receive not only the signal from the desired transmitter, but also the interference signals from other transmitters. To discriminate the signal from the desired transmitter and suppress the interference signals from other transmitters, the receivers have to obtain some knowledge of each transmitter, e.g., the transmit power. Knowledge of the transmit power of each transmitter can be used to optimize the interference cancellation at wireless receiver, to calculate the received power from each transmitter for SINR measurement, power control or other purpose.

The estimation of the transmission power at the wireless receiver is usually based on some known sequence, so called pilot signal, transmitted at the transmitter. However, the transmit power of the pilot signal is not a fixed portion of the total transmit power at each transmitter. Therefore, it is not accurate to estimate the total transmit power of each transmitter by using the known sequence directly. Embodiments of the present invention provide answers or solutions to the problems by providing improved transmission power estimation and calculation.

Referring now to FIG. 1, therein is shown a communication system 100 with transmission power estimation mechanism in an embodiment of the present invention. The communication system 100 includes a network 102. The network 102 is defined as a system of wired or wireless communications devices that are connected to each other for enabling communication between devices.

For example, the network 102 can be a set of connections between wireless cellular phone network having base stations, communication towers and antennae, servers, or client devices. As a further example, the network 102 can include wireless communication, wired communication, optical, ultrasonic, or the combination thereof. Ethernet, digital subscriber line (DSL), fiber to the home (FTTH), and plain old telephone service (POTS) are examples of wired communication that can be included in the network 102.

Wireless radio frequency channels, a multi-channel cellular network, an Evolved High Speed Packet Access ("HSPA+") network, a Third Generation Partnership Project Long Term Evolution ("3GPP LTE") network, a 3GPP LTE-Advanced network, and other cellular network are examples of wireless communication that can be included in the network 102. As a further example, the network 102 can include wireless communication based on a code division multiple access (CDMA).

Further, the network 102 can traverse a number of network topologies and distances. For example, the network 102 can include direct connection, personal area network (PAN), local area network (LAN), metropolitan area network (MAN), wide area network (WAN) or any combination thereof.

The network 102 can include network base stations 104. The network base stations 104 are defined as stations to receive, transmit, relay, process, or combination thereof, of wireless signals. As an example, the network base stations 104 can be cellular routing devices, cell towers, evolved nodes B ("eNB"), computers, grid computing resources, virtualized computer resources, cloud computing resources, routers, switches, peer-to-peer distributed computing devices, or a combination thereof.

A designated mobile station 108 can be connected to the network 102 through one or more of the network base stations 104. The designated mobile station 108 is defined as device capable of wireless communication with a communication network. For example, the designated mobile station 108 can be of any of a variety of mobile devices, such as user equipment (UE), a cellular phone, personal digital assistant, a notebook computer, automotive telematic telecommunication system, or other multi-functional mobile communication or entertainment device. The designated mobile station 108 can be a standalone device, or can be incorporated with a vehicle, for example a car, truck, bus, or train.

In another example, the designated mobile station 108 can be a particularized machine, such as a portable computing device, a thin mobile station, a notebook, a netbook, a smartphone, personal digital assistant, or a cellular phone, and as specific examples, a Samsung Galaxy S™, a Samsung Galaxy Tab™, an Apple iPhone™, Palm Centro™, or Moto Q Global™. In yet another example, the designated mobile station 108 can be a particularized mobile machine, such as a mobile mainframe, a mobile base station, a cluster base station, a rack mounted base station in a vehicle, or a mobile blade base station, or as more specific examples, an IBM System z10™ Business Class mainframe or a HP ProLiant ML™ base station.

The network base stations 104 can facilitate communication between the designated mobile station 108 and the network 102 by sending, receiving, and relaying communication signals to and from the designated mobile station 108. For example, one or more of the network base stations 104 can transmit a base transmission signal 106 to the designated mobile station 108. The base transmission signal 106 is defined as a signal broadcast or transmitted by the base station.

The base transmission signal 106 can be transmitted through a communication channel 112 to the designated mobile station 108. The communication channel 112 is defined as a medium through which the signal propagates. For example, the channel can include the property or behavior of the medium, such as reflection and loss caused by wires or refractions and obstructions in wireless environment.

The designated mobile station 108 can receive a designated received signal 110. The designated received signal 110 is defined as all signals received by the mobile station. For example, the designated received signal 110 can include the base transmission signal 106 from one or more of the network base stations 104. As a further example, the designated received signal 110 can include interference due to reflection and of the base transmission signal 106 or noise, such as Additive Gaussian White Noise (AGWN). The designated mobile station 108 can process the designated received signal 110 for displaying images or text or for transmitting audio sounds on a device, including the designated mobile station 108.

Figure 2:
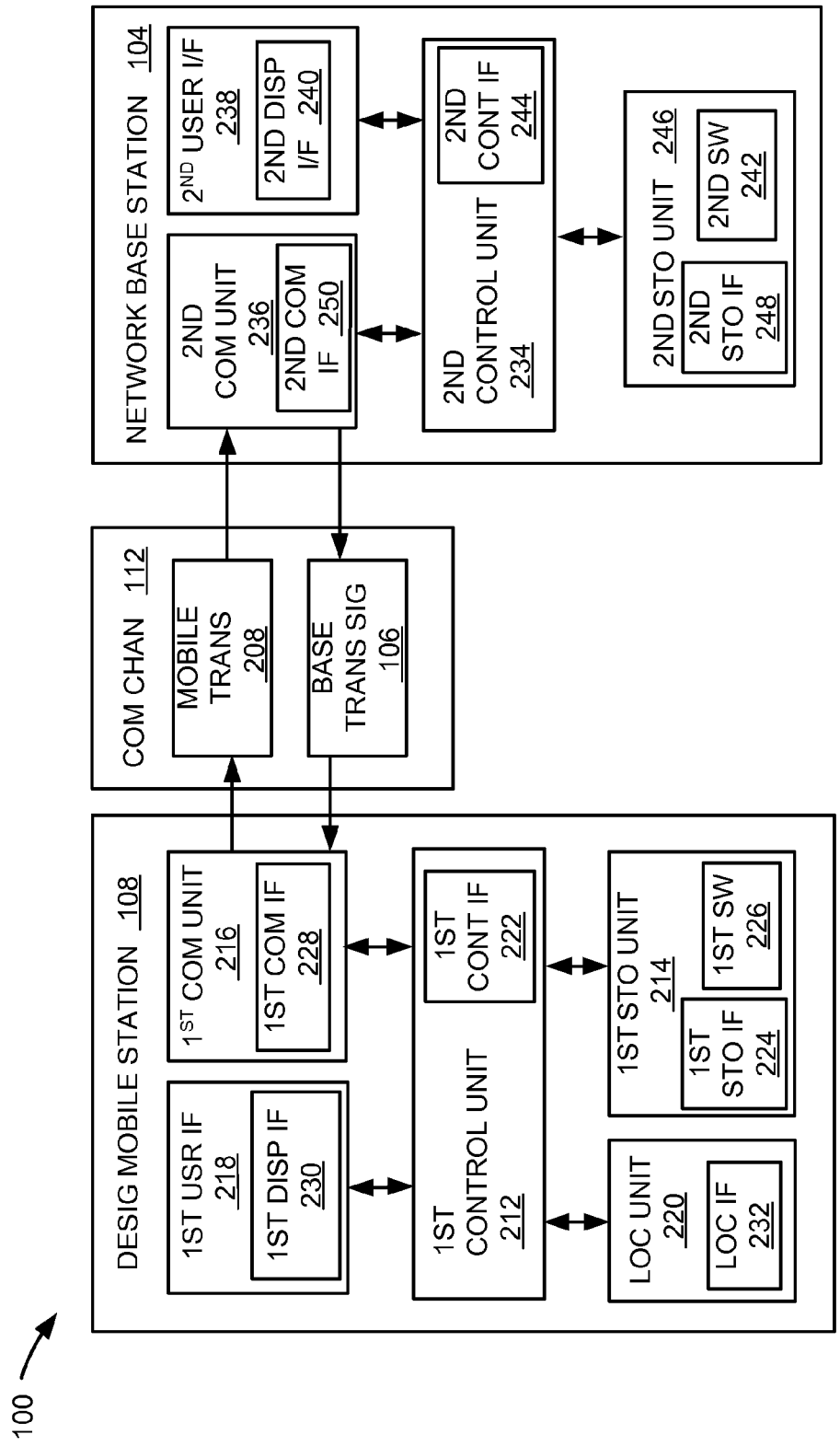
FIG. 2 is an exemplary block diagram of the communication system.

Referring now to FIG. 2, therein is shown an exemplary block diagram of the communication system 100. The communication system 100 can include the designated mobile station 108, the communication channel 112, and the network base stations 104.

The designated mobile station 108 can send information in a mobile transmission 208 through the communication channel 112 to the network base stations 104. The network base stations 104 can send information in the base transmission signal 106 through the communication channel 112 to the designated mobile station 108.

For illustrative purposes, the communication system 100 is shown with the designated mobile station 108 as a client device, although it is understood that the communication system 100 can have the designated mobile station 108 as a different type of device. For example, the designated mobile station 108 can be a server.

Also for illustrative purposes, the communication system 100 is shown with the network base stations 104 as a server and a communications tower and base station, although it is understood that the communication system 100 can have the network base stations 104 as a different type of device. For example, the network base stations 104 can be a client device.

For brevity of description in this embodiment of the present invention, the designated mobile station 108 will be described as a client device and the network base stations 104 will be described as communication base station having a communications tower. The present invention is not limited to this selection for the type of devices. The selection is an example of the present invention.

The designated mobile station 108 can include a first control unit 212, a first storage unit 214, a first communication unit 216, a first user interface 218, and a location unit 220. The first control unit 212 can include a first control interface 222. The first storage unit 214 can include a first storage interface 224.

The first control unit 212 can execute a first software 226 to provide the intelligence of the communication system 100. The first control unit 212 can operate the first user interface 218 to display information generated by the communication system 100. The first control unit 212 can also execute the first software 226 for the other functions of the communication system 100, including receiving location information from the location unit 220. The first control unit 212 can further execute the first software 226 for interaction with the communication channel 112 of FIG. 1 via the first communication unit 216.

The first control unit 212 can be implemented in a number of different manners. For example, the first control unit 212 can be a processor, an embedded processor, a microprocessor, a hardware control logic, a hardware finite state machine, a digital signal processor, or a combination thereof.

The first control unit 212 can include the first control interface 222. The first control interface 222 can be used for communication between the first control unit 212 and other functional units in the designated mobile station 108. The first control interface 222 can also be used for communication that is external to the designated mobile station 108.

The first control interface 222 can receive information from the other functional units or from external sources, or can transmit information to the other functional units or to external destinations. The external sources and the external destinations refer to sources and destinations external to the designated mobile station 108.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system, optical circuitry, waveguides, wireless circuitry, wireline circuitry, or a combination thereof.

The first storage unit 214 can store the first software 226. The first storage unit 214 can also store the relevant information, such as reference symbols associated with a base station, advertisements, points of interest, navigation routing entries, or any combination thereof.

The first storage unit 214 can be a volatile memory, a nonvolatile memory, an internal memory, an external memory, or a combination thereof. For example, the first storage unit 214 can be a nonvolatile storage such as nonvolatile random access memory, Flash memory, disk storage, or a volatile storage such as static random access memory.

The first storage unit 214 can include the first storage interface 224. The first storage interface 224 can be used for communication between the location unit 220 and other functional units in the designated mobile station 108. The first storage interface 224 can also be used for communication that is external to the designated mobile station 108.

The first storage interface 224 can receive information from the other functional units or from external sources, or can transmit information to the other functional units or to external destinations. The external sources and the external destinations refer to sources and destinations external to the designated mobile station 108.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the designated mobile station 108. For example, the first communication unit 216 can permit the designated mobile station 108 to communicate with the network base stations 104 of FIG. 1, an attachment, such as a peripheral device or a computer desktop, and the communication channel 112.

The first communication unit 216 can also function as a communication hub allowing the designated mobile station 108 to function as part of the communication channel 112 and not limited to be an end point or terminal unit to the communication channel 112. The first communication unit 216 can include active and passive components, such as microelectronics or an antenna, for interaction with the communication channel 112.

The first communication unit 216 can include a first communication interface 228. The first communication interface 228 can be used for communication between the first communication unit 216 and other functional units in the designated mobile station 108. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user to interface and interact with the designated mobile station 108. The first user interface 218 can include an input device and an output device. Examples of the input device of the first user interface 218 can include a keypad, a touchpad, soft-keys, a keyboard, a microphone, or any combination thereof to provide data and communication inputs.

The first user interface 218 can include a first display interface 230. Examples of the output device of the first user interface 218 can include the first display interface 230. The first display interface 230 can include a display, a projector, a video screen, a speaker, or any combination thereof.

The location unit 220 can generate location information, current heading, current acceleration, and current speed of the designated mobile station 108, as examples. The location unit 220 can be implemented in many ways. For example, the location unit 220 can function as at least a part of GPS, an inertial navigation system, a cellular-tower location system, a pressure location system, or any combination thereof. Also, for example, the location unit 220 can utilize components such as an accelerometer or GPS receiver.

The location unit 220 can include a location interface 232. The location interface 232 can be used for communication between the location unit 220 and other functional units in the designated mobile station 108. The location interface 232 can also be used for communication that is external to the designated mobile station 108.

The location interface 232 can receive information from the other functional units or from external sources, or can transmit information to the other functional units or to external destinations. The external sources and the external destinations refer to sources and destinations external to the designated mobile station 108.

The location interface 232 can include different implementations depending on which functional units or external units are being interfaced with the location unit 220. The location interface 232 can be implemented with technologies and techniques similar to the implementation of the first control unit 212.

For illustrative purposes, the designated mobile station 108 is shown with the partition having the first control unit 212, the first storage unit 214, the first user interface 218, the first communication unit 216, and the location unit 220 although it is understood that the communication system 100 can have a different partition. For example, the first software 226 can be partitioned differently such that some or all of its function can be in the first control unit 212, the location unit 220, and the first communication unit 216. Also, the designated mobile station 108 can include other functional units not shown in FIG. 2 for clarity.

The functional units in the designated mobile station 108 can work individually and independently of the other functional units. The designated mobile station 108 can work individually and independently from the network base stations 104 and the communication channel 112.

The network base stations 104 can be optimized for implementing the present invention in a multiple device embodiment with the designated mobile station 108. The network base stations 104 can provide the additional or higher performance processing power compared to the designated mobile station 108. The network base stations 104 can include a second control unit 234, a second communication unit 236, and a second user interface 238.

The second user interface 238 allows a user to interface and interact with the network base stations 104. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the network base stations 104 of the communication system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the communication system 100, including operating the second communication unit 236 to communicate with the designated mobile station 108 through the communication channel 112.

The second control unit 234 can be implemented in a number of different manners. For example, the second control unit 234 can be a processor, an embedded processor, a microprocessor, a hardware control logic, a hardware finite state machine, a digital signal processor, or a combination thereof.

The second control unit 234 can include a second controller interface 244. The second controller interface 244 can be used for communication between the second control unit 234 and other functional units in the network base stations 104. The second controller interface 244 can also be used for communication that is external to the network base stations 104.

The second controller interface 244 can receive information from the other functional units or from external sources, or can transmit information to the other functional units or to external destinations. The external sources and the external destinations refer to sources and destinations external to the network base stations 104.

The second controller interface 244 can be implemented in different ways and can include different implementations depending on which functional units or external units are being interfaced with the second controller interface 244. For example, the second controller interface 244 can be implemented with a pressure sensor, an inertial sensor, a micro electromechanical system, optical circuitry, waveguides, wireless circuitry, wireline circuitry, or a combination thereof.

A second storage unit 246 can store the second software 242. The second storage unit 246 can also store the relevant information, such as phone numbers, identification information, information for multiple access, such as code, frequency, or time slot, advertisements, points of interest, navigation routing entries, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the communication system 100 is shown with the second storage unit 246 as a single hierarchy storage system, although it is understood that the communication system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as nonvolatile random access memory, Flash memory, disk storage, or a volatile storage such as static random access memory.

The second storage unit 246 can include a second storage interface 248. The second storage interface 248 can be used for communication between the location unit 220 and other functional units in the network base stations 104. The second storage interface 248 can also be used for communication that is external to the network base stations 104.

The second storage interface 248 can receive information from the other functional units or from external sources, or can transmit information to the other functional units or to external destinations. The external sources and the external destinations refer to sources and destinations external to the network base stations 104.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the network base stations 104. For example, the second communication unit 236 can permit the network base stations 104 to communicate with the designated mobile station 108 through the communication channel 112.

The second communication unit 236 can also function as a communication hub allowing the network base stations 104 to function as part of the communication channel 112 and not limited to be an end point or terminal unit to the communication channel 112. The second communication unit 236 can include active and passive components, such as microelectronics or an antenna, for interaction with the communication channel 112.

The second communication unit 236 can include a second communication interface 250. The second communication interface 250 can be used for communication between the second communication unit 236 and other functional units in the network base stations 104. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication channel 112 to send information to the network base stations 104 in the mobile transmission 208. The network base stations 104 can receive information in the second communication unit 236 from the mobile transmission 208 of the communication channel 112.

The second communication unit 236 can couple with the communication channel 112 to send information to the designated mobile station 108 in the base transmission signal 106. The designated mobile station 108 can receive information in the first communication unit 216 from the base transmission signal 106 of the communication channel 112. The communication system 100 can be executed by the first control unit 212, the second control unit 234, or a combination thereof.

For illustrative purposes, the network base stations 104 is shown with the partition having the second user interface 238, the second storage unit 246, the second control unit 234, and the second communication unit 236, although it is understood that the network base stations 104 can have a different partition. For example, the second software 242 can be partitioned differently such that some or all of its function can be in the second control unit 234 and the second communication unit 236. Also, the network base stations 104 can include other functional units not shown in FIG. 2 for clarity.

The functional units in the network base stations 104 can work individually and independently of the other functional units. The network base stations 104 can work individually and independently from the designated mobile station 108 and the communication channel 112.

For illustrative purposes, the communication system 100 is described by operation of the designated mobile station 108 and the network base stations 104. It is understood that the designated mobile station 108 and the network base stations 104 can operate any of the modules and functions of the communication system 100. For example, the designated mobile station 108 is described to operate the location unit 220, although it is understood that the network base stations 104 can also operate the location unit 220.

For further illustrative purposes, the communication system 100 is described as having the designated mobile station 108 interacting with the network base stations 104 through the communication channel 112.

Figure 3:
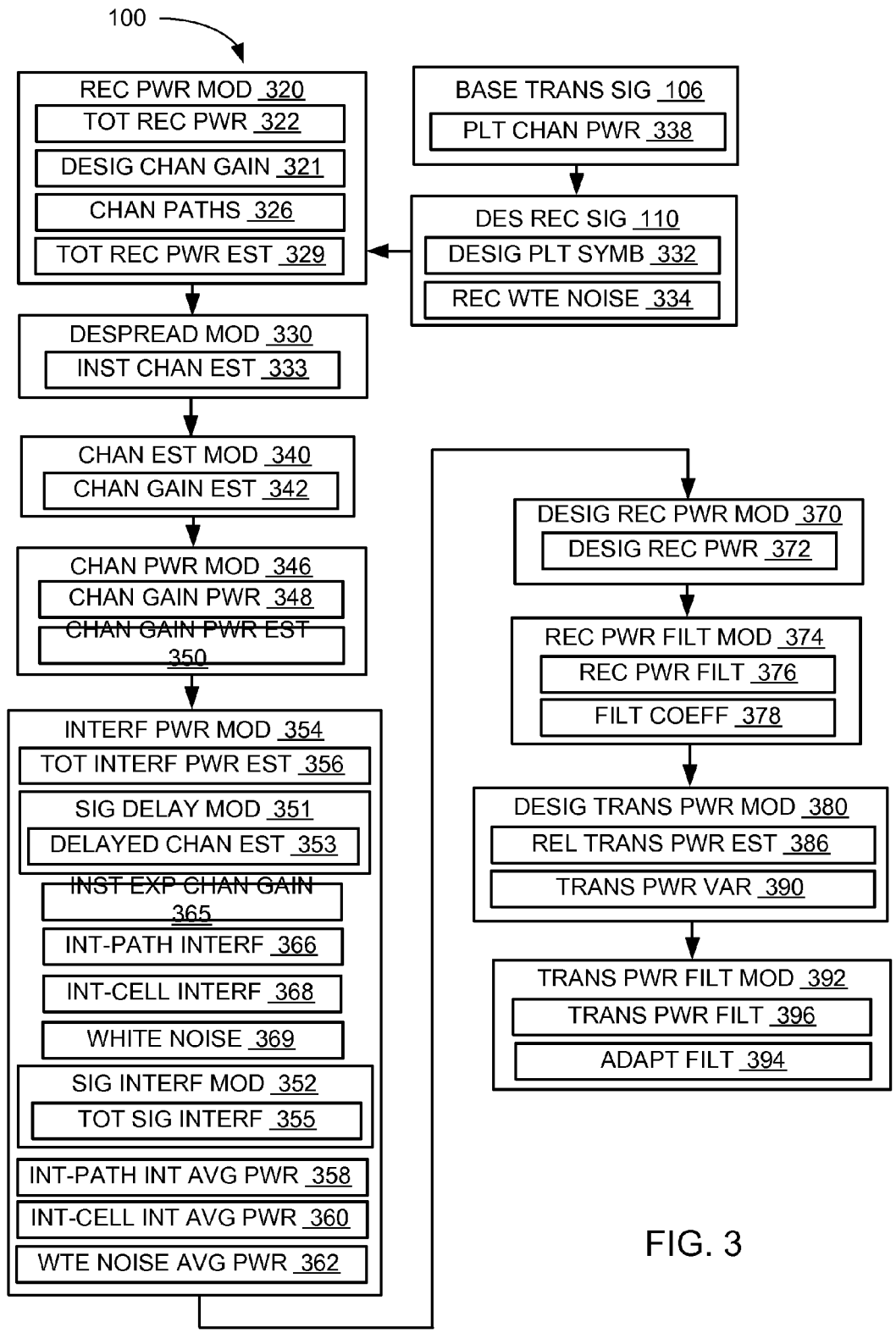
FIG. 3 is a control flow of the communication system.

Referring now to FIG. 3, therein is shown a control flow of the communication system 100. The communication system 100 can include a total received power module 320. The total received power module 320 is for determining the power received by the mobile station based on transmitted signals from one or more base stations. The total received power module 320 can determine a total received power 322 for the designated mobile station 108 of FIG. 1.

The total received power 322 is defined as the total power of signals received by the mobile station from one or more base stations. For example, the total received power 322 can include the base transmission signal 106 from one or more of the network base stations 104 of FIG. 1.

The total received power module 320 can determine the total received power 322 with the designated received signal 110. For example, the total received power module 320 can calculate the total received power 322 as the square of the absolute value of the designated received signal 110.

The total received power 322 can be expressed as the expectation of the designated received signal 110 given a designated channel gain 321. The designated channel gain 321 is defined as the signal gain for the channel affected by signal deviation or attenuation. For example, the designated channel gain 321 can be the signal gain for the communication channel 112 of FIG. 1 affected by multipath fading or shadow fading. As a further example, the designated channel gain 321 can be based on propagation of the base transmission signal 106 along channel paths 326 of the communication channel 112.

The channel paths 326 are defined as paths of signal propagation through the channel between the base station and the mobile station. For example, the channel paths 326 can be the propagation paths of the base transmission signal 106 through the communication channel 112 between one of the network base stations 104 and the designated mobile station 108. As a further example, the base transmission signal 106 can propagate along one or more of the channel paths 326 within the communication channel 112.

As an example, the total received power 322 can be expressed according to equation 1 as follows:

$$I_o = E\{|r(k)|^2 | h\}$$ (Equation 1)

The total received power 322 can be represented as "$I_o$". The designated received signal 110 is represented by the function "r( )". The designated channel gain 321 is represented as "h". In this example, "h" can represent all of the designated channel gain 321 for any of the network base stations 104.

As a further example, the total received power module 320 can calculate the total received power 322 as a total received power estimation 329 based on the designated received signal 110. The total received power estimation 329 can be calculated as the expectation of an average of power for the designated received signal 110. As a specific example, the total received power estimation 329 can be calculated according to equation 2, as follows:

$$\hat{I}_o = E\left\{\frac{1}{N}\sum_{k=mN}^{mN+N-1} |r(k)|^2 | h\right\}$$ (Equation 2)

The total received power estimation 329 can be represented as "Î". A spreading factor of the base transmission signal 106 for one of the network base stations 104 is represented by the index "N".

The communication system 100 can include a despreader module 330. The despreader module 330 is for dispreading signals received by the mobile station. The despreader module 330 can descramble and despread the designated received signal 110 based on a designated pilot symbol 332 associated with one of the network base stations 104 to calculate an instantaneous channel estimation 333.

The designated pilot symbol 332 is defined as a reference sequence or signal associated with the base station. As an example, the designated pilot symbol 332 can be used to identify transmissions sent from a specific one of the network base stations 104. The designated pilot symbol 332 can be repeatedly and periodically transmitted by the network base station 104. The designated mobile station 108 can receive the designated pilot symbol 332 as a portion of the designated received signal 110.

The instantaneous channel estimation 333 is defined as a characterization of a channel based on a single received transmission of the pilot symbol. The characterization of the channel can include measurement or analysis of noise and interference due to the behavior of the medium, such as reflection and signal loss caused by wires or refractions and obstructions in wireless environments. The instantaneous channel estimation 333 can be the characterization of the communication channel 112 based on a single received transmission of the designated pilot symbol 332.

The designated received signal 110 can be expressed based on the designated channel gain 321, the base transmission signal 106 of one of the network base stations 104, and a received white noise 334. The received white noise 334 is defined as the white signal noise received by the mobile station. For example, the received white noise 334 can signal noise due to Additive Gaussian White Noise (AGWN).

As an example, the designated received signal 110 can be represented according to equation 3 as follows:

$$r(k) = \sum_i \sum_l h_{i,l}(\lfloor k/N \rfloor) x_i(k-l) + w(k)$$ (Equation 3)

The designated received signal 110 for the "k-th" chip is represented by the function "r( )". The designated channel gain 321 is represented by the function "$h_{i,l}$( )", where the subscript "i" refers to the "$i^{th}$" one of the network base stations 104 transmitting to the designated mobile station 108 and the subscript "l" refers to the "$l^{th}$" one of the channel paths 326. The spreading factor of the base transmission signal 106 for one of the network base stations 104 is represented by the index "N". The base transmission signal 106 for a one of the network base stations 104 is represented by the function "$x_i$( )". The received white noise 334 is represented by the function "w( )".

In general, the base transmission signal 106 can be expressed as a function of at least a pilot channel power 338 and the designated pilot symbol 332 for one of the network base stations 104. The pilot channel power 338 can be the transmission power for the common pilot indicator channel (CPICH). The pilot channel power 338 can be a known value or known portion of the transmission power of one of the network base stations 104.

As an example, the base transmission signal 106 of one of the network base stations 104 can be expressed according to equation 4 as follows:

$$x_i(k) = c_i(k) \cdot \sqrt{E_{c,pilot,i}} \cdot p_i + \sum_{n=1}^{N-1} c_i(k) \cdot w_n(\text{mod}(k,N)) \cdot g_{i,n} \cdot s_{i,n}(\lfloor k/N \rfloor)$$ (Equation 4)

The base transmission signal 106 can be represented by the function "$x_i$( )". The scrambling code can be represented by the function "$c_i$( )". The pilot channel power 338 can be represented by the variable "$E_{c, pilot, i}$". The designated pilot symbol 332 can be represented by "$p_i$". The spread code is represented by the function "$w_n$(mod( ))". The code channel gain is represented by "$g_{i,n}$". The allocated information is represented by the function "$s_{i,n}$( )".

The despreader module 330 can despread the received signal 110 to calculate the instantaneous channel estimation 333 based on the designated pilot symbol 332 associated with the specific one of the network base stations 104. For example, the despreader module 330 can utilize a correlation base method, a minimum mean-square error (MMSE) method, or a maximum likelihood (ML) method to calculate the instantaneous channel estimation 333.

As an example, the despreader module 330 can utilize the correlation based method having a complex conjugate operation and an accumulator operation. As a specific example, the despreader module 330 can calculate the instantaneous channel estimation 333 by applying a complex conjugate operation to the designated pilot symbol 332, which is then multiplied with the designated received signal 110. The despreader module 330 can continue calculation of the instantaneous channel estimation 333 by performing an accumulator operation on the output of the multiplication operation.

As a further example, the despreader module 330 can calculate the instantaneous channel estimation 333 according to equation 5 as follows:

$$\hat{h}_{i,l}(m) = \frac{1}{N} \sum_{k=mN}^{mN+N-1} r(k)c_i^*(k-l) \quad \text{(Equation 5)}$$

The instantaneous channel estimation 333 for the "$l^{th}$" one of the channel path 326 of the "$i^{th}$" one of the network base station 104 can be represented as "$\hat{h}_{i,l}(m)$", where "m" is an index for the "$m^{th}$" transmission of the designated pilot symbol 332 received by the designated mobile station 108. The spreading factor of the base transmission signal 106 for the "$i^{th}$" one of the network base stations 104 can be represented as "N".

The communication system 100 can include a channel estimation module 340, coupled to the despreader module 330. The channel estimation module 340 is for calculating the gain for a channel between a mobile station and a base station. The channel estimation module can calculate a channel gain estimation 342 based on the instantaneous channel estimation 333 received from the despreader module 330. The channel gain estimation 342 is defined as a estimation of the channel gain. For example, the channel gain estimation 342 can be a calculated estimation of the designated channel gain 321.

As an example, the channel estimation module 340 can calculate the designated channel gain 321 as a time average of the instantaneous channel estimation 333 for a series of received transmissions of the designated pilot symbol 332. As a further example, the channel estimation module 340 can calculate the channel gain estimation 342 based on an expectation of the instantaneous channel estimation 333 according to equation 6 as follows:

$$\hat{h}_{i,l} = E\{\hat{h}_{i,l}(m)\} \quad \text{(Equation 6)}$$

The communication system 100 can include a channel power module 346, coupled to the channel estimation module 340. The channel power module 346 is for calculating the power associated with the signal gain of the channel between the base station and the mobile station. The channel power module 346 can calculate power as the square of the absolute value of the gain or strength of a signal.

The channel power module 346 can calculate a channel gain power 348 and a channel gain power estimation 350. The channel gain power 348 can be calculated based on the designated channel gain 321. The channel gain power estimation 350 can be calculated based on the channel gain estimation 342.

The communication system 100 can include an interference power module 354, coupled to the despreader module 330. The interference power module 354 is for calculating the power due to noise and interference. The interference power module 354 can calculate a total interference power estimation 356. The total interference power estimation 356 is defined as the power due to noise and interference in a received signal.

The interference power module 354 can include a signal delay module 351 and a signal interference module 352. The signal delay module 351 is for delaying a signal for a specified duration. The signal delay module 351 can receive the instantaneous channel estimation 333 for one of the transmissions of the designated pilot symbol 332 from the despreader module 330.

The signal delay module 351 can delay the instantaneous channel estimation 333 to generate a delayed channel estimation 353. The signal delay module 351 can generate the delayed channel estimation 353 for a specified duration. For example, the specified duration can be the length of the designated pilot symbol 332.

The instantaneous channel estimation 333 and the delayed channel estimation 353 can be expressed as a function of the pilot channel power 338, an instantaneous expected channel gain 365, an inter-path interference 366, an inter-cell interference 368, and white noise 369. The instantaneous expected channel gain 365 is defined as the channel gain of the pilot symbol or signal that is expected without interference due to other paths, signals from other cells, and noise.

The inter-path interference 366 is defined as the interference due to signal paths within a channel. The inter-cell interference 368 is defined as the interference due to signals from other base station cells.

As an example, the instantaneous channel estimation 333 for a single transmission of the designated pilot symbol 332 can be expressed according to equation 7 as follows:

$$\hat{h}_{i,l}(m) = \sqrt{E_{c,pilot,i}} h_{i,l}(m) + \epsilon_{IPI,l}(m) \epsilon_{ICI,l}(m) + \epsilon_{Noise,l}(m) \quad \text{(Equation 7)}$$

The instantaneous expected channel gain 365 can be represented as "$h_{i,l}(m)$" where "m" is an index for the "$m^{th}$" transmission of the designated pilot symbol 332 received by the designated mobile station 108. The inter-path interference 366 can be represented as "$\epsilon_{IPI,l}(m)$". The inter-cell interference can be represented as "$\epsilon_{ICI,l}(m)$". The white noise 369 can be represented as "$\epsilon_{Noise,l}(m)$".

Similarly, for example, the delayed channel estimation 353 can be expressed according to equation 8 as follows:

$$\hat{h}_{i,l}(m-1) = \sqrt{E_{c,pilot,i}} h_{i,l}(m-1) + \epsilon_{IPI,l}(m-1) \epsilon_{ICI,l}(m-1) + \epsilon_{Noise,l}(m-1) \quad \text{(Equation 8)}$$

The delayed channel estimation 353 can be represented as "$\hat{h}_{i,l}(m-1)$" where "m−1" is the index for the immediately preceding transmission of the designated pilot symbol 332 received by the designated mobile station 108.

The signal interference module 352 is for calculating the total interference and noise in a signal. The signal interference module 352 can calculate a total signal interference 355 based on the instantaneous channel estimation 333 and the delayed channel estimation 353. The total signal interference 355 is defined as the combine interference from the channel, other base stations, and noise.

As an example, the signal interference module 352 can calculate the total signal interference 355 as the difference between the instantaneous channel estimation 333 and the delayed channel estimation 353.

The interference power module 354 can calculate the total interference power estimation 356 based on expectation of the instantaneous channel estimation 333 given the channel gain estimation 342. As an example, the total interference power estimation 356 can be calculated according to equation 9 as follows:

$$\hat{\sigma}_{I,l}^2 = E\left\{\frac{1}{2}\left|\hat{h}_{i,l}(m) - \hat{h}_{i,l}(m-1)\right|^2 \mid h_{i,l}\right\} \quad \text{(Equation 9)}$$

The total interference power estimation 356 can be represented by the variable "$\sigma_{I,l}^2$". The total signal interference 355 can be represented as "$\hat{h}_{i,l}(m) - \hat{h}_{i,l}(m-1)$".

The total interference power estimation 356 can represent the sum of an inter-path interference average power 358, an inter-cell interference average power 360, and a white noise average power 362.

The inter-path interference average power 358 is defined as the average power of interference due to signal paths within a channel. The inter-cell interference average power 360 is defined as the average power of interference due to signals from other base station cells.

As an example, the total interference power estimation 356 can be represented according to equation 10 as follows:

$$\sigma_{I,l}^2 = \sigma_{IPI,l}^2 + \sigma_{ICI,l}^2 + \sigma_{Noise,l}^2 \quad \text{(Equation 10)}$$

The total interference power estimation 356 can be represented as "$\sigma_{I,l}^2$". The inter-path interference average power 358 can be represented as "$\sigma_{IPI,l}^2$". The inter-cell interference average power 360 can be represented as "$\sigma_{ICI,l}^2$". The white noise average power 362 can be represented as "$\sigma_{Noise,l}^2$".

The communication system 100 can include a designated received power module 370, coupled to the total received power module 320. The designated received power module 370 is for calculating the power for a specific signal from a received signal by removing power due to interference and noise. The designated received power module 370 can calculate a designated received power 372 by subtracting the total interference power estimation 356 from the total received power estimation 329.

The designated received power 372 is defined as the received signal power associated with a transmission from a specific base station. As an example, the designated received power module 370 can calculate the designated received power 372 according to equation 11 as follows:

$$\hat{I}_{or,i,l} = \hat{I}_o - N\hat{\sigma}_{I,l}^2 \quad \text{(Equation 11)}$$

The designated received power 372 is represented by the variable "$\hat{I}_{or,i,l}$". The spreading factor can be represented as "N".

The communication system 100 can include a received power filter module 374, coupled to the designated received power module 370. The received power filter module 374 is for removing noise due to signal and power estimation. The received power filter module 374 can filter the designated received power 372 with a received power filter 376, such as an Infinite Impulse Response (IIR) filter. The bandwidth of the received power filter 376 can broad to accommodate for the rate of change for the channel gain estimation 342.

The received power filter 376 can include a filter coefficient 378. As an example, the received power filter module 374 can determine or set the value of the filter coefficient 378 for the received power filter 376 based on the rate of change of the channel gain estimation 342. As a further example, the filter coefficient 378 for the received power filter 376 can be similar to the filter coefficient 378 used in channel estimation.

The communication system 100 can include a designated transmission power module 380, coupled to the received power filter module 374. The designated transmission power module 380 is for determining the relative transmission power of a specific base station and calculating the variance of the power transmission. These functions will be discussed in further detail below.

The designated transmission power module 380 can determine a relative transmission power estimation 386. The relative transmission power estimation 386 is defined as the ratio between the base station transmission power and the signal power. For example, the relative transmission power estimation 386 can be the ratio of the designated received power 372 to the pilot channel power 338, such as the multi-cell common channel for a specific one of the network base stations 104.

The designated transmission power module 380 can calculate a transmission power variance 390. The transmission power variance 390 is defined as the mathematical variance of the relative transmission power estimation 386.

The communication system 100 can include a transmission power filter module 392 coupled to the designated transmission power module 380. The transmission power filter module 392 is for removing noise due to signal and power estimation. The transmission power filter module 392 can filter the relative transmission power estimation 386 a transmission power filter 396, such as an Infinite Impulse Response (IIR) filter.

The bandwidth of the transmission power filter 396 can be narrow to account for the rate of change of the relative transmission power estimation 386. As an example, the bandwidth of the transmission power filter 396 can be narrower than the bandwidth of the received power filter 376.

The transmission power filter 396 can include the filter coefficient 378. As an example, the transmission power filter module 392 can determine or set the value of the filter coefficient 378 for the transmission power filter 396 based on the time variance of the relative transmission power estimation 386 of one of the network base stations 104.

As a further example, the transmission power filter module 392 can include the transmission power filter 396 based on an adaptive filter 394. The adaptive filter 394 can include the filter coefficient 378 that is dynamically adjusted individually for the relative transmission power estimation 386.

Also for illustrative purposes, the communication system 100 is shown with the transmission power filter module 392 having the adaptive filter 394, although it is understood that other filtering modules can include the adaptive filter 394. For example, the received power filter module 374 can include the received power filter 376 based on the adaptive filter 394.

It has been discovered that the combination of filtering the designated received power 372 with the received power filter 376 and filtering the relative transmission power estimation 386 with the transmission power filter 396 provides accurate power estimation. The received power filter 376 can be determined based on the rate of change of the channel gain estimation 342 while the transmission power filter 396 can be adjusted separately based on the time variance of the relative transmission power estimation 386 which improves accuracy.

The communication system 100 can be implemented on the designated mobile station 108, on the network base station 104, or partitioned between the designated mobile station 108 and the network base station 104. In an example for the designated mobile station 108, the first communication unit 216 can receive the designated received signal 110 from the communication channel 112.

The first software 226 of FIG. 2 of the designated mobile station 108 can include the total received power module 320, the despreader module 330, the channel estimation module 340, the channel power module 346, the signal delay module 351, the signal interference module 352, the interference power module 354, the designated received power module 370, the received power filter module 374, the designated transmission power module 380, and the transmission power filter module 392. The first control unit 212 of FIG. 2 can execute the first software 226.

For example, the first control unit 212 can execute the total received power module 320 to calculate the total received power 322. As another example, first control unit 212 can execute the channel estimation module 340 to calculate the channel gain estimation 342. The first control unit 212 can include the received power filter 376 and the transmission power filter 396.

In an example for the network base station 104, the second software 242 of FIG. 2 can include the total received power module 320, the despreader module 330, the channel estimation module 340, the channel power module 346, the signal delay module 351, the signal interference module 352, the interference power module 354, the designated received power module 370, the received power filter module 374, the designated transmission power module 380, and the transmission power filter module 392. The second control unit 234 of FIG. 2 can execute the second software 242.

For example, the second control unit 234 can execute the total received power module 320 to calculate the total received power 322. As another example, the second control unit 234 can execute the channel estimation module 340 to calculate the channel gain estimation 342. The second control unit 234 can include the received power filter 376 and the transmission power filter 396.

In another example, the communication system 100 can be partitioned between the designated mobile station 108 and the network base stations 104. For example, the first software 226 can include the total received power module 320, the despreader module 330, the channel estimation module 340, and the channel power module 346. To continue the example, the second software 242 can include the signal delay module 351, the signal interference module 352, the interference power module 354, the designated received power module 370, the received power filter module 374, the designated transmission power module 380, and the transmission power filter module 392. The exemplary partition of the communication system 100 between the designated mobile station 108 and the network base stations 104 is only an example of the partition and it is understood that the modules can be executed and partitioned differently.

The communication system 100 describes the module functions or order as an example. Each of the modules can operate individually and independently of the other modules.

Furthermore, data generated in one module can be used by another module without being directly coupled to each other. For example, the despreader module 330 can receive the designated received signal 110.

It is understood that the various modules described above can be implemented as hardware in the first control unit 212, the second control unit 234, or both. The different modules can also be implemented as separate hardware mechanism, circuit, or device (not illustrated) in the designated mobile station 108, the network base stations 104, or a combination thereof.

The communication system 100, the designated mobile station 108, or a combination thereof can process the designated received signal 110 to calculate the relative transmission power estimation 386 for displaying images or text or for transmitting audio sounds on a device, including the designated mobile station 108. For example, the relative transmission power estimation 386 in wireless communications can be used for interference cancellation or suppression, signal to noise ratio (SINR) measurement, and power control for improved transmission of data or information for displaying images or text or for transmitting audio sounds on a device, including the designated mobile station 108.

The physical transformation of the base transmission signal 106 sent from the network base stations 104 results in movement in the physical world, such as people using the designated mobile station 108 to receive the designated received signal 110 from the network base stations 104 for calculating the relative transmission power estimation 386 from the designated received power 372 for operation of the communication system 100. As the movement in the physical world occurs, the movement itself creates additional information, such as changes to the communication channel 112, the inter-path interference 366, the inter-cell interference 368, and the white noise 369, that can be used for updated calculation of the relative transmission power estimation 386 for the continued operation of the communication system 100 and movement in the physical world.

Figure 4:
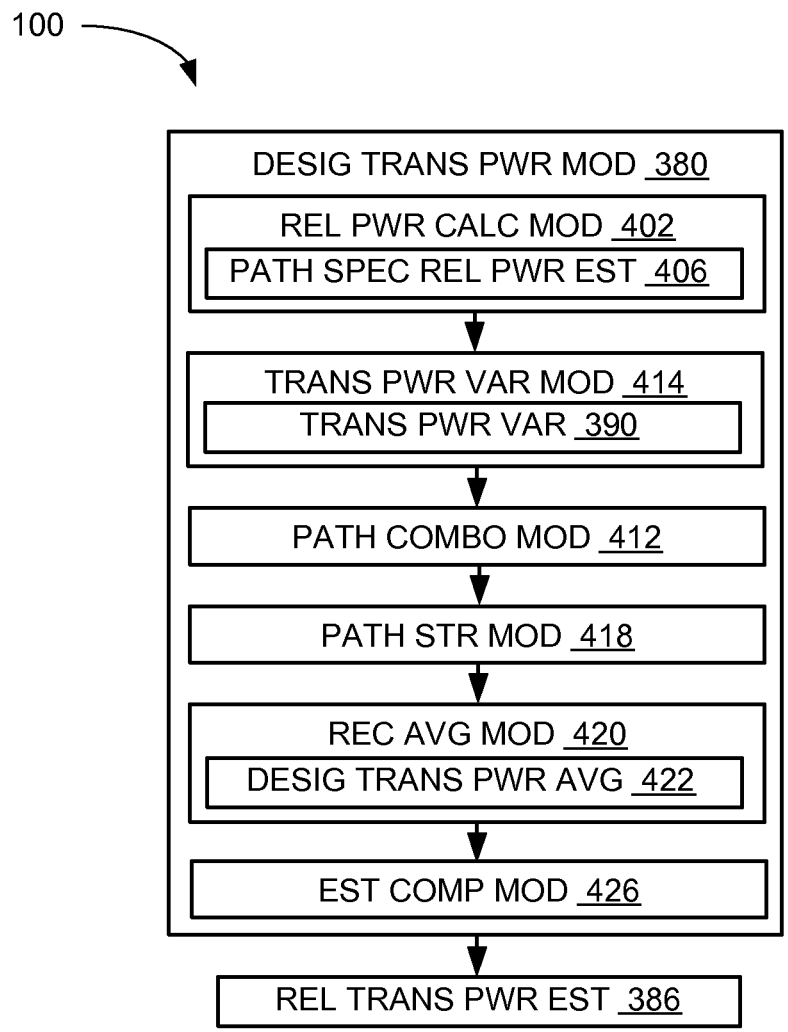
FIG. 4 is a view of the designated transmission power module.

Referring now to FIG. 4, therein is shown a view of the designated transmission power module 380. The designated transmission power module 380 can determine the relative transmission power estimation 386 based on a path specific relative power estimation 406. The path specific relative power estimation 406 is defined as the ratio between the total transmission power of the base station and the pilot signal power for a single path in the channel between the base station and the mobile station.

The designated transmission power module 380 can determine the path specific relative power estimation 406 with a relative power calculation module 402. The relative power calculation module 402 is for calculating the transmission power for a single path of the channel between the base station and the mobile station relative to the transmission power of the pilot signal for the base station. The relative power calculation module 402 can calculate the path specific relative power estimation 406 for one of the channel paths 326 of the communication channel 112.

The relative power calculation module 402 can calculate the path specific relative power estimation 406 based on the designated received power 372 of FIG. 3 and the channel gain power estimation 350 of FIG. 3 for one of the channel paths 326 of FIG. 3. The designated received power 372 can include the difference between the total received power 322 of FIG. 3 and the total interference power estimation 356 of FIG. 3, as expressed in equation 11, above.

The relative power calculation module 402 can calculate the path specific relative power estimation 406 as the quotient of the designated received power 372 and the channel gain power estimation 350. As an example, the relative power calculation module 402 can calculate the path specific relative power estimation 406 according to equation 12 as follows:

$$\hat{R}_{i,l} = \frac{\hat{I}_o - N\hat{\sigma}_{i,l}^2}{|\hat{h}_{i,l}|^2} \qquad \text{(Equation 12)}$$

The path specific relative power estimation 406 can represented as "$\hat{R}_{i,l}$" where "i" represents the index for one of the network base stations 104 of FIG. 1 and "l" represents the index for one of the channel paths 326 of FIG. 3 in the communication channel 112 of FIG. 1. The total received power 322 can be represented as "$\hat{I}_o$". The total interference power estimation 356 for one of the channel paths 326 "l" and one of the network base stations 104 "i" can be represented as "$\hat{\sigma}_{i,l}^2$". The spreading factor for the base transmission signal 106 of FIG. 1 can be represented as "N". The channel gain power estimation 350 for one of the channel paths 326 "l" and one of the network base stations 104 "i" can be represented as "$\hat{h}_{i,l}$".

It has been discovered that present invention provides accurate estimation of the path specific relative power estimation 406. Calculation based on the designated received power 372 of FIG. 3 and the channel gain power estimation 350 FIG. 3 provides accurate estimation of the path specific relative power estimation 406.

The relative power calculation module 402 can calculate the path specific relative power estimation 406 based on the designated received signal 110 of FIG. 1 from more than one of the channel paths 326. For example, the designated transmission power module 380 can implement the relative power calculation module 402 for each of the channel paths 326 in the communication channel 112 to calculate the path specific relative power estimation 406.

The designated transmission power module 380 can determine the relative transmission power estimation 386 by selecting the relative transmission power estimation 386 as one of the path specific relative power estimation 406 for one of the channel paths 326 of FIG. 3. As an example, the designated transmission power module 380 can determine the relative transmission power estimation 386 according to equation 13, as follows:

$$\hat{R}_i = \hat{R}_{i,l} \quad \text{(Equation 13)}$$

The relative transmission power estimation 386 can be represented as "$R_i$". The path specific relative power estimation 406 for the "$l^{th}$" one of the channel paths 326 can represented as "$\hat{R}_{i,l}$".

Alternatively, the designated transmission power module 380 can determine the relative transmission power estimation 386 with a path combination module 412, a path strength module 418, a receiver average module 420, or a combination thereof. The designated transmission power module 380 can determine the relative transmission power estimation 386 with the path combination module 412 or the path strength module 418 based on the transmission power variance 390 and the path specific relative power estimation 406.

The designated transmission power module 380 can calculate the transmission power variance 390 with a transmission power variance module 414. The transmission power variance module 414 is for calculating the variance of calculated or estimated transmission power. The transmission power variance module 414 can be coupled to the relative power calculation module 402.

The transmission power variance module 414 can calculate the transmission power variance 390 based on the path specific relative power estimation 406. As an example, the transmission power variance 390 can be represented according to equation 14 as follows:

$$\mathrm{Var}\{\hat{R}_{i,l}\} = E\left\{\left|\frac{\hat{I}_o - N\hat{\sigma}_{I,l}^2}{|\hat{h}_{i,l}|^2 + \sigma_e^2} - \frac{I_o - N\sigma_{I,l}^2}{|h_{i,l}|^2 E_{c,CPICH,i}}\right|^2\right\} \quad \text{(Equation 14)}$$

The transmission power variance 390 can be represented as "$\mathrm{Var}\{\hat{R}_{i,l}\}$". The channel variance of the channel gain estimation 342 of FIG. 3, "$\hat{h}_{i,l}$", can be represented as "$\sigma_e^2$".

When the channel variance, "$\sigma_e^2$", of the channel gain estimation 342 is negligible or approximately zero, the channel gain estimation 342 can be considered as having a very high accuracy. When the channel gain estimation 342 is determined to have a high accuracy, the transmission power variance module 414 can approximate the transmission power variance 390 according to equation 15 as follows:

$$\mathrm{Var}\{\hat{R}_{i,l}\} \approx \frac{I_o^2}{|h_{i,l}|^4 E_{c,CPICH,i}^2} \quad \text{(Equation 15)}$$

The pilot channel power 338 of FIG. 3 can be represented as "$E_{c,CPICH,i}$". The transmission power variance 390 can be represented as "$\mathrm{Var}\{\hat{R}_{i,l}\}$".

The path combination module 412, coupled to the relative power calculation module 402, is for calculating the transmission power of a base station based on the aggregate of transmission powers for multiple signal paths of the channel. For example, the path combination module 412 can calculate the relative transmission power estimation 386 based on an aggregate or combination of the path specific relative power estimation 406, the transmission power variance 390, or a combination thereof.

As an example, the path combination module 412 can calculate the relative transmission power estimation 386 with a Maximum Ratio Combining (MRC) method according to equation 16, as follows:

$$\hat{R}_i = \frac{\sum_l \frac{\hat{R}_{i,l}}{\mathrm{Var}\{\hat{R}_{i,l}\}}}{\sum_l \frac{1}{\mathrm{Var}\{\hat{R}_{i,l}\}}} \quad \text{(Equation 16)}$$

As a further example, when the transmission power variance 390 is estimated according to equation 15, the path combination module 412 can calculate the relative transmission power estimation 386 according to equation 17 as follows:

$$\hat{R}_i = \frac{\sum_l |\hat{h}_{i,l}|^4 \hat{R}_{i,l}}{\sum_l |\hat{h}_{i,l}|^4} \quad \text{(Equation 17)}$$

It has been discovered that calculating the relative transmission power estimation 386 as the aggregate of the path specific relative power estimation 406 improves accuracy. The aggregate of the path specific relative power estimation 406 for all the channel paths 326 of the communication channel 112 improves compared to calculation of the relative transmission power estimation 386 based on a single one of the channel paths 326.

The path strength module 418, coupled to the transmission power variance module 414, is for determining the transmission signal of a channel having the highest strength. The strength of the path specific relative power estimation 406 can be inversely proportional to the transmission power variance 390. For example, the lower the transmission power variance 390, the higher the strength of the path specific relative power estimation 406.

The designated transmission power module 380 can determine the relative transmission power estimation 386 based on a comparison of the transmission power variance 390 corresponding to the path specific relative power estimation 406 for each of the channel paths 326. For example, the path strength module 418 can determine the path specific relative power estimation 406 having the highest strength by comparing the transmission power variance 390 for each of the path specific relative power estimation 406. As a specific example, the path strength module 418 can compare the transmission power variance 390 of one of the path specific relative power estimation 406 with the transmission power variance 390 of another one of the path specific relative power estimation 406. The designated transmission power module 380 can determine or select the relative transmission power estimation 386 as the path specific relative power estimation 406 having the lowest value of the transmission power variance 390, which is the path specific relative power estimation 406 having the highest strength.

It has been discovered that determining the relative transmission power estimation 386 as the path specific relative power estimation 406 having the lowest value of the transmission power variance 390 provide an accurate estimation of the relative transmission power estimation 386. The accuracy of the relative transmission power estimation 386 is improved because the transmission power variance 390 decreased when the path specific relative power estimation 406 of one of the channel paths 326 increases in strength.

The receiver average module 420 is for calculating the power of a received signal based on an average of independently received signals. For example, the designated mobile station 108 of FIG. 1 having more than one of the first communication unit 216 of FIG. 2, such as two or more antennas, can receive the designated received signal 110 independently at each of the first communication unit 216. To continue the example, the receiver average module 420 can calculate the path specific relative power estimation 406 independently for the designated received signal 110 associated with one of the first communication unit 216 using the modules of FIG. 3 or the modules described above. As a specific example, if the designated mobile station 108 includes three of the first communication unit 216, the designated transmission power module 380 can utilize the relative power calculation module 402 to calculate the path specific relative power estimation 406 for the designated received signal 110 received by each of the first communication unit 216.

The receiver average module 420 can calculate a designated transmission power average 422 based on the path specific relative power estimation 406 associated with each of the first communication unit 216. The designated transmission power average 422 is defined as the average of transmission powers calculated based on signals received at different receivers.

To continue the example, the receiver average module 420 can calculate the designated transmission power average 422 as an average of the path specific relative power estimation 406 associated with each of the first communication unit 216. As a specific example, if the designated mobile station 108 includes three of the first communication unit 216, the receiver average module 420 can calculate the designated transmission power average 422 as the average of the path specific relative power estimation 406 associated each of the first communication unit 216. The designated transmission power module 380 can determine the relative transmission power estimation 386 as the designated transmission power average 422.

It has been discovered that present invention provides the relative transmission power estimation 386 having improved accuracy. The designated transmission power average 422 calculated as the average of the path specific relative power estimation 406 associated with two or more of the first communication unit 216 improves accuracy in determining the relative transmission power estimation 386 of one of the network base stations 104 of FIG. 1.

The designated transmission power module 380 can include an estimation compensation module 426, coupled to the relative power calculation module 402. The estimation compensation module 426 is for biased estimation compensation of a power estimation. The estimation compensation module 426 can adjust the expectation value for the path specific relative power estimation 406.

As an example, the expectation for the path specific relative power estimation 406 can be calculated according to equation 18 as follows:

$$E\{\hat{R}_{i,l}\} = E\left\{\frac{\hat{I}_o - N\hat{\sigma}_{I,l}^2}{\left|\sqrt{E_{c,cpich,i}}\, h_{i,l} + e\right|^2}\right\} \quad \text{(Equation 18)}$$

The estimation error of the designated channel gain 321 of FIG. 3 is represented as "e". As a further example, the expectation for the path specific relative power estimation 406, as represented in equation 19, can be approximated as equation 19, as follows:

$$E\{\hat{R}_{i,l}\} \approx R_{i,l}\left(1 + \frac{\sigma_e^2}{\left|\sqrt{E_{c,cpich,i}}\, h_{i,l}\right|^2}\right) \quad \text{(Equation 19)}$$

The variance of the designated channel gain 321 is represented as "$\sigma_e^2$". The designated channel gain 321 is represented as "$h_{i,l}$".

The bias for the expectation value of the path specific relative power estimation 406 "$\hat{R}_{i,l}$", as calculated by equation 19 above, can be compensated based on the variance "$\sigma_e^2$" of the designated channel gain 321. As an example, the relative transmission power estimation 386 can be compensated for bias according to equation 20 as follows:

$$\hat{R}_{i,l} = \frac{\hat{I}_o - N\hat{\sigma}_{I,l}^2}{\left|\hat{h}_{i,l}\right|^2 + \sigma_e^2} \quad \text{(Equation 20)}$$

The variance "$\sigma_e^2$" of the designated channel gain 321 can be estimated according to the total interference power estimation 356 of FIG. 3, $\hat{\sigma}_{I,l}^2$, and the filter coefficient used in the channel estimation.

The communication system 100 describes the module functions or order as an example. Each of the modules can operate individually and independently of the other modules. Furthermore, data generated in one module can be used by another module without being directly coupled to each other. For example, the estimation compensation module 426 can receive the path specific relative power estimation 406.

It is understood that the various modules described above can be implemented as hardware in the first control unit 212 of FIG. 2, the second control unit 234 of FIG. 2, or both. The different modules can also be implemented as separate hardware mechanism, circuit, or device (not illustrated) in the designated mobile station 108, the network base stations 104, or a combination thereof.

Figure 5:
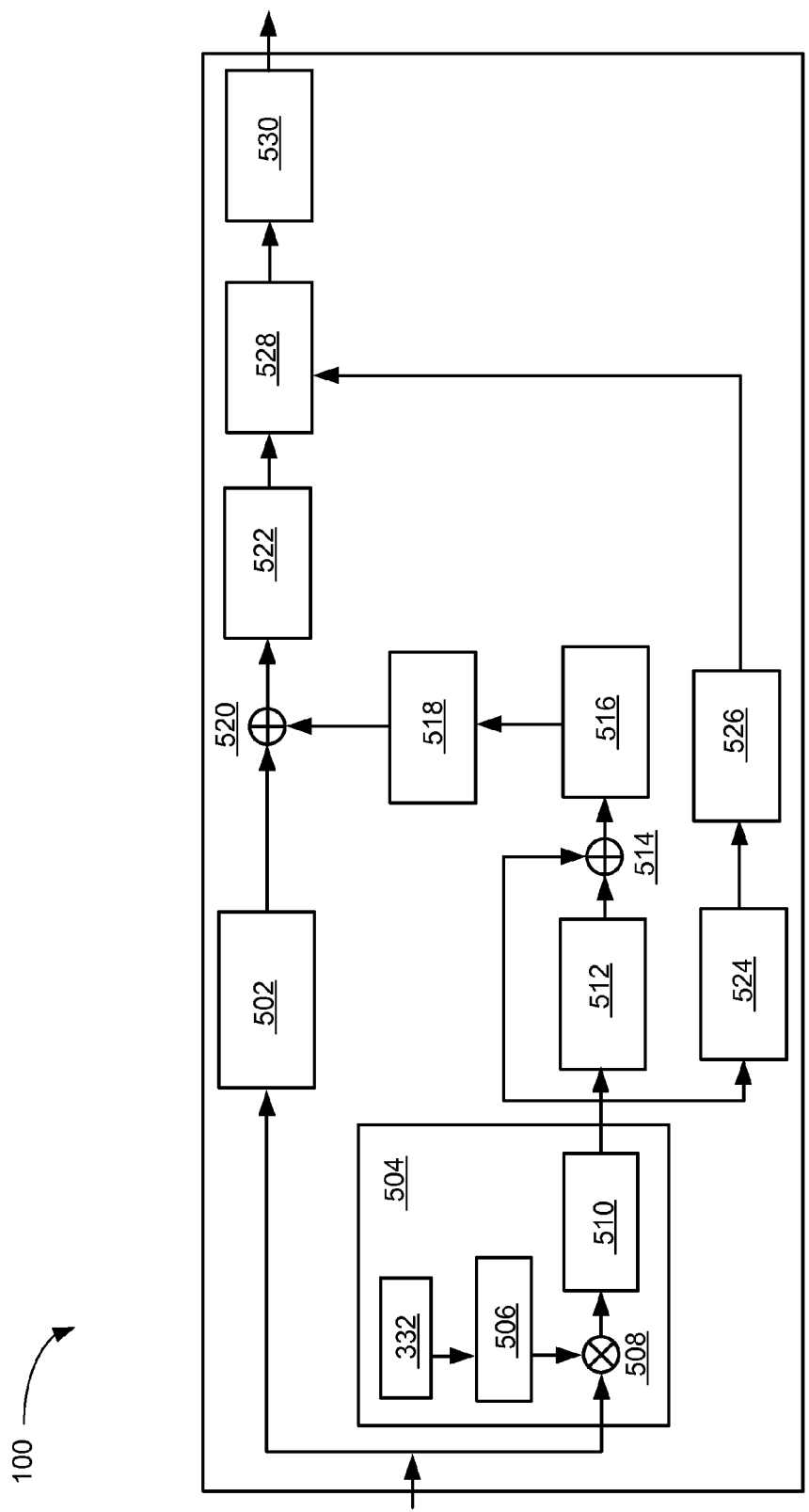
FIG. 5 is an example block diagram of the communication system.

Referring now to FIG. 5, therein is shown an example block diagram of the communication system 100. The block diagram can represent hardware blocks for a portion of the designated mobile station 108 of FIG. 1 receiving the base transmission signal 106 of FIG. 1.

The communication system 100 can include a received power calculation block 502. The received power calculation block can implement the received power module of FIG. 3 for calculation of the designated received power 372 of FIG. 3 based on the designated received signal 110 of FIG. 1. The received power calculation block 502 can be coupled to the first communication unit 216 of FIG. 2, the first control unit 212 of FIG. 2, or a combination thereof.

The communication system 100 can include a despreader block 504 that receives the designated received signal 110. The despreader block 504 is for despreading the designated received signal 110. The despreader block 504 can implement the despreader module 330 of FIG. 3. The despreader block 504 can be coupled to the first control unit 212, the first storage unit 214 of FIG. 2, or a combination thereof.

The despreader block 504 can include a conjugate block 506, a multiplication block 508, and an accumulator block 510. The conjugate block 506 can apply the complex conjugate operation to the designated pilot symbol 332 of FIG. 1 associated with one of the network base stations 104 of FIG. 3. The despreader block 504 can be coupled to the first control unit 212, the first storage unit 214, or a combination thereof.

The output of the conjugate block 506 can be multiplied with the designated received signal 110 in the multiplication block 508. The output of the multiplication block 508 can be processed by the accumulator block 510 to calculate the instantaneous channel estimation 333. The multiplication block 508 can be coupled to the first control unit 212, the first storage unit 214, or a combination thereof.

The output of the despreader block 504 can be delayed with a delay block 512 to generate the delayed channel estimation 353 of FIG. 3. The delay block 512 can implement the signal delay module 351 of FIG. 3. The delay block 512 can be coupled to the despreader block 504, the first control unit 212, the first storage unit 214, or a combination thereof.

A difference calculation between the instantaneous channel estimation 333 and the delayed channel estimation 353 can be performed by a signal difference block 514. The signal difference block 514 can implement the signal interference module 352 of FIG. 3 to calculate the total signal interference 355 of FIG. 3. The signal difference block 514 can be coupled to the first control unit 212, the first storage unit 214, or a combination thereof.

The communication system 100 can include an interference power estimation block 516 coupled to the signal difference block 514. The interference power estimation block 516 can receive the total signal interference 355, which is the output of the signal difference block 514. The interference power estimation block 516 can implement the interference power module 354 of FIG. 3 to calculate the total interference power estimation 356 of FIG. 3. The interference power estimation block 516 can be coupled to the first control unit 212, the first storage unit 214, or a combination thereof.

A power division block 518 can be in series with the interference power estimation block 516. The power division block 518 can divide the output from the interference power estimation block 516 to calculate the total interference power estimation 356. The power division block 518 can be coupled to the first control unit 212, the first storage unit 214, or a combination thereof.

The communication system 100 can include a power difference block 520 coupled to the power division block 518 and the received power calculation block 502. The power difference block 520 can receive the output of the received power calculation block 502 and the power division block 518. The power difference block 520 can implement the designated received power module 370 of FIG. 3 for calculating the difference between the designated received power 372 and the total interference power estimation 356. The power difference block 520 can calculate the designated received power 372. The power difference block 520 can be coupled to the first control unit 212, the first storage unit 214, or a combination thereof.

The output of the power difference block 520 can be filtered with a received power filter block 522. The received power filter block 522 can implement the received power filter module 374 for filtering the designated received power 372. The received power filter block 522 can be coupled to the first control unit 212, the first storage unit 214, or a combination thereof.

The communication system 100 can include a channel estimation block 524 coupled to the despreader block 504. The channel estimation block 524 can implement the channel estimation module 340 of FIG. 3 for calculating the channel gain estimation 342 from the designated received signal 110 that has been despread and descrambled in the despreader block 504. The channel estimation block 524 can be coupled to the first control unit 212, the first storage unit 214, or a combination thereof.

A channel power block 526 can receive the output of the channel estimation block 524 to calculate the channel gain power estimation 350 of FIG. 3. The channel power block 526 can implement the channel estimation module 340 of FIG. 3. The channel power block 526 can be coupled to the first control unit 212, the first storage unit 214, or a combination thereof.

The communication system 100 can include a channel division block 528, coupled to the designated transmission power module 380 of FIG. 3. The channel division block 528 can receive the output of the channel power block 526 and the received power filter block 522. The channel division block 528 can divide the output of the channel power block 526 and the received power filter block 522 to calculate the relative transmission power estimation 386 of FIG. 3. The channel division block 528 can be coupled to the first control unit 212, the first storage unit 214, or a combination thereof.

The output of the channel division block 528 can be filtered by a transmission power filter block 530. The transmission power filter block 530 can implement the transmission power filter module 392 of FIG. 3. The transmission power filter block 530 can be coupled to the first control unit 212, the first storage unit 214, or a combination thereof.

It has been discovered that calculation of the relative transmission power estimation 386 of FIG. 3 based on the channel gain power 348 of FIG. 3 and the designated received power 372 reduces complexity. Since the calculation of the channel gain power 348 and the designated received power can be accomplished by the sharing of hardware blocks, the communication system 100 can have reduced complexity.

Figure 6:
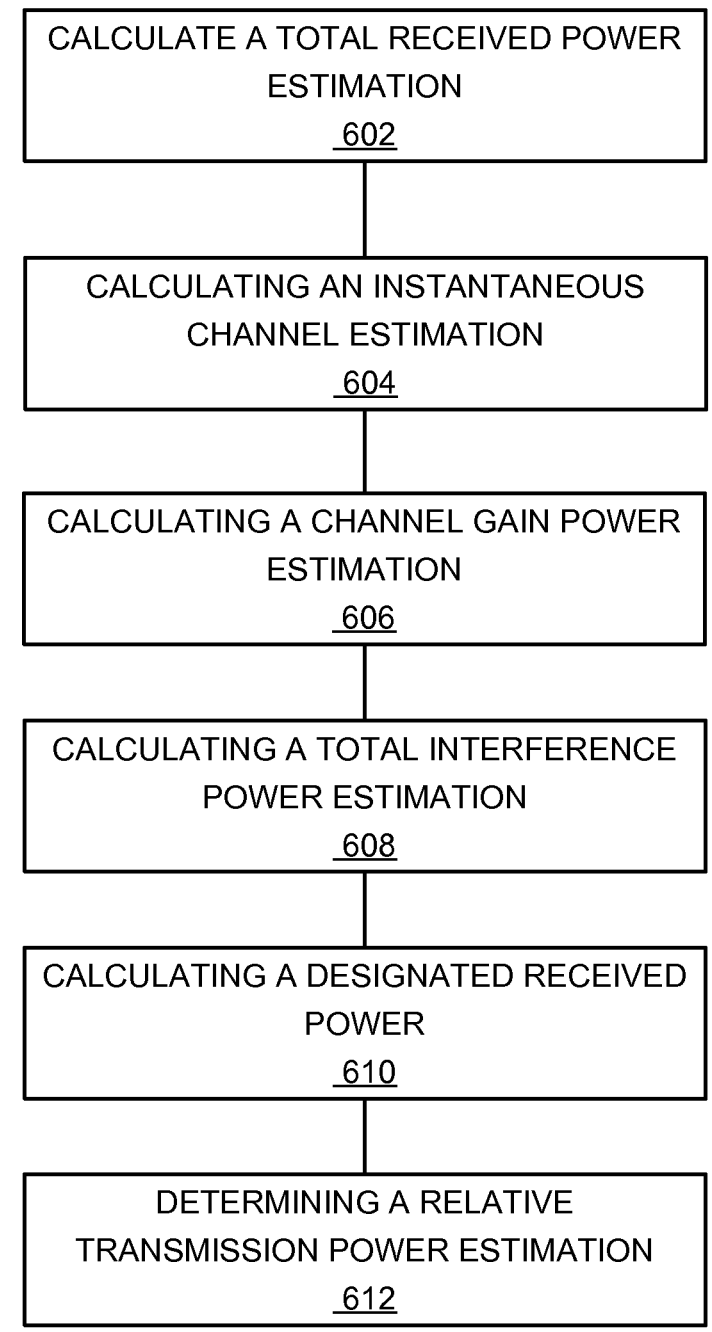
FIG. 6 is a flow chart of a method of operation of the communication system of FIG. 1 in a further embodiment of the present invention.

Referring now to FIG. 6, therein is shown a flow chart of a method 600 of operation of a communication system of FIG. 1 in a further embodiment of the present invention. The method 600 includes: calculating a total received power estimation based on a designated received signal having a designated pilot symbol in a block 602; calculating an instantaneous channel estimation based on the designated pilot symbol in a block 604; calculating a channel gain power estimation based on the instantaneous channel estimation in a block 606; calculating a total interference power estimation based on a difference between the instantaneous channel estimation and a delayed channel estimation in a block 608; calculating a designated received power based on a difference between the total received power estimation and the total interference power estimation in a block 610; and determining a relative transmission power estimation based on the designated received power and the channel gain power estimation for communicating with a device in a block 612.

Thus, it has been discovered that the telecommunication system of the present invention furnishes important and heretofore unknown and unavailable solutions, capabilities, and functional aspects for a telecommunication system with signal processing mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims All matters hithertofore set forth herein or shown in the accompanying drawings are to be interpreted in an illustrative and non-limiting sense.

What is claimed is:

1. A method of operation of a communication system comprising:
    calculating a total received power estimation based on a designated received signal having a designated pilot symbol;
    calculating an instantaneous channel estimation based on the designated pilot symbol;
    calculating a channel gain power estimation based on the instantaneous channel estimation;
    calculating a total interference power estimation based on a difference between the instantaneous channel estimation and a delayed channel estimation;
    calculating a designated received power based on a difference between the total received power estimation and the total interference power estimation; and
    determining a relative transmission power estimation based on the designated received power and the channel gain power estimation for communicating with a device.

2. The method as claimed in claim 1 wherein determining a relative transmission power estimation includes calculating a path specific relative power estimation as the quotient of the designated received power and the channel gain power estimation.

3. The method as claimed in claim 1 wherein determining the relative transmission power estimation includes determining the relative transmission power estimation based on aggregating a path specific relative power estimation for channel paths.

4. The method as claimed in claim 1 wherein determining the relative transmission power estimation includes determining the relative transmission power estimation based on comparing a transmission power variance of a path specific relative power estimation with the transmission power variance of another one of the path specific relative power estimation.

5. The method as claimed in claim 1 wherein determining the relative transmission power estimation includes determining the relative transmission power estimation as a designated transmission power average.

6. A method of operation of a communication system comprising:
    calculating a total received power estimation based on a designated received signal having a designated pilot symbol;
    calculating an instantaneous channel estimation based on the designated pilot symbol
    calculating a channel gain power estimation based on the instantaneous channel estimation;
    calculating a total interference power estimation based on a difference between the instantaneous channel estimation and a delayed channel estimation;
    calculating a designated received power based on a difference between the total received power estimation and the total interference power estimation;
    calculating a path specific relative power estimation based on the designated received power and the channel gain power estimation; and
    determining a relative transmission power estimation based on the path specific relative power estimation for communicating with a device.

7. The method as claimed in claim 6 wherein calculating the path specific relative power estimation includes calculating the path specific relative power estimation for a channel path of a communication channel.

8. The method as claimed in claim 6 further comprising adjusting the path specific relative power estimation for bias estimation based on estimation compensation.

9. The method as claimed in claim 6 further comprising filtering the relative transmission power estimation with a transmission power filter.

10. The method as claimed in claim 6 further comprising filtering the relative transmission power estimation with a received power filter.

11. A communication system comprising:
    a total received power module for calculating a total received power estimation based on a designated received signal having a designated pilot symbol;
    a despreader module, coupled to the total received power module, for calculating an instantaneous channel estimation based on the designated pilot symbol;
    a channel power module, coupled to the despreader module, for calculating a channel gain power estimation based on the instantaneous channel estimation;
    an interference power module, coupled to the despreader module, for calculating a total interference power estimation based on a difference between the instantaneous channel estimation and a delayed channel estimation;
    a designated received power module, coupled to the interference power module, for calculating a designated received power based on a difference between the total received power estimation and the total interference power estimation; and
    a designated transmission power module, coupled to the designated received power module, for determining a relative transmission power estimation based on the designated received power and the channel gain power estimation for communicating with a device.

12. The system as claimed in claim 11 wherein the designated transmission power module includes a relative power calculation module, coupled to the designated transmission power module, for calculating a path specific relative power estimation as the quotient of the designated received power and the channel gain power estimation.

13. The system as claimed in claim 11 wherein the designated transmission power module for determining the relative transmission power estimation includes a path combination module, coupled to the designated transmission module, aggregating a path specific relative power estimation for channel paths.

14. The system as claimed in claim 11 wherein the designated transmission power module includes a path strength module, coupled to the designated transmission power module, for comparing a transmission power variance of a path specific relative power estimation with the transmission power variance of another one of the path specific relative power estimation.

15. The system as claimed in claim 11 wherein the designated transmission power module for determining the relative transmission power estimation includes a receiver average module, coupled to the designated transmission power module, for calculating a designated transmission power average.

16. The system as claimed in claim 11 further comprising:
a transmission power filter module, coupled to the designated transmission power module, for filtering the relative transmission power estimation with a transmission power filter; and
wherein the designated transmission power module includes a relative power calculation module, coupled to the designated transmission power module, for calculating a path specific relative power estimation based on the designated received power and the channel gain power estimation.

17. The system as claimed in claim 16 wherein the relative power calculation module is for calculating the path specific relative power estimation for a channel path of a communication channel.

18. The system as claimed in claim 16 further comprising an estimation compensation module, coupled to the designated transmission power module, for adjusting the path specific relative power estimation for bias estimation based on estimation compensation.

19. The system as claimed in claim 16 wherein the transmission power filter module is for filtering relative transmission power estimation with an adaptive filter.

20. The system as claimed in claim 16 further comprising a received power filter module, coupled to the designated received power module, for filtering the relative transmission power estimation with a received power filter.

* * * * *